United States Patent

Jeon

(10) Patent No.: US 9,550,497 B2
(45) Date of Patent: Jan. 24, 2017

(54) APPARATUS AND METHOD FOR CONTROLLING DRIVING MODE OF VEHICLE

(71) Applicants: Hyundai Motor Company, Seoul (KR); Kia Motors Corporation, Seoul (KR)

(72) Inventor: Byeong Wook Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/799,200

(22) Filed: Jul. 14, 2015

(65) Prior Publication Data

US 2016/0082965 A1 Mar. 24, 2016

(30) Foreign Application Priority Data

Sep. 22, 2014 (KR) ........................ 10-2014-0126184

(51) Int. Cl.
*G06F 7/00* (2006.01)
*B60W 30/182* (2012.01)
*B60W 40/09* (2012.01)
*B60W 50/10* (2012.01)
*F16H 59/00* (2006.01)

(52) U.S. Cl.
CPC ............ *B60W 30/182* (2013.01); *B60W 40/09* (2013.01); *B60W 50/10* (2013.01); *B60W 2540/10* (2013.01); *B60W 2540/12* (2013.01); *B60W 2540/18* (2013.01); *B60W 2540/30* (2013.01);
(Continued)

(58) Field of Classification Search
CPC ................................................. B60W 30/182
See application file for complete search history.

(56) References Cited

U.S. PATENT DOCUMENTS

| 2009/0099727 A1* | 4/2009 | Ghoneim | B60W 40/08 701/36 |
| 2012/0179342 A1* | 7/2012 | Noumura | B60W 10/06 701/54 |
| 2012/0203399 A1* | 8/2012 | Filev | B60W 30/02 701/1 |

FOREIGN PATENT DOCUMENTS

DE 102013104855 A1 7/2014
JP 3446438 B2 9/2003
(Continued)

OTHER PUBLICATIONS

European Search Report for European Patent Application No. 15178703.3, dated Mar. 9, 2016, 6 pages.

*Primary Examiner* — Imran Mustafa
(74) *Attorney, Agent, or Firm* — Mintz Levin Cohn Ferris Glovsky and Popeo, P.C.; Peter F. Corless

(57) ABSTRACT

An apparatus and a method for controlling a driving mode of a vehicle are provided to control the driving mode according to a short term driving tendency and a long term driving tendency. The apparatus includes a driving information detector that detects driving information to determine driving tendency and a controller that calculates a short term driving tendency index based on the driving. The controller operates at least one of an engine and a transmission based on the short term driving tendency index and calculates a middle term driving tendency index using the short term driving tendency index. A delay time is then determined using the middle term driving tendency index. The controller enters a sport mode based on the short term driving tendency index and releases the sport mode after delaying the delay time when the short term driving tendency index satisfies releasing conditions of the sport mode.

14 Claims, 5 Drawing Sheets

(52) U.S. Cl.
CPC ..... *B60W 2900/00* (2013.01); *F16H 2059/003* (2013.01)

(56) References Cited

FOREIGN PATENT DOCUMENTS

| | | |
|---|---|---|
| JP | 4565831 | 10/2010 |
| JP | 4978747 | 7/2012 |
| KR | 10-0373027 | 2/2003 |
| KR | 10-2014-0085143 | 7/2014 |

* cited by examiner

APPARATUS AND METHOD FOR CONTROLLING DRIVING MODE OF VEHICLE

CROSS-REFERENCE TO RELATED APPLICATION

This application claims priority to and the benefit of Korean Patent Application No. 10-2014-0126184 filed in the Korean Intellectual Property Office on Sep. 22, 2014, the entire contents of which are incorporated herein by reference.

BACKGROUND (a) Field of the Invention

The present invention relates to an apparatus and a method for controlling a driving mode of a vehicle. More particularly, the present invention relates to an apparatus and a method for controlling a driving mode of a vehicle that controls the driving mode based on a short term driving tendency and a long term driving tendency of a driver.

(b) Description of the Related Art

Customer satisfaction of driving performance of a vehicle depends on how accurately the vehicle runs according to the driving tendency of the driver. While tendencies of the drivers vary, performance characteristics of a vehicle are set to one performance characteristic in the same type of vehicle model. Therefore, reaction of the vehicle may not coincide with the tendency of the driver.

Accordingly, when the driving tendency of the driver is detected and a shift of the vehicle is controlled to coincide with the tendency of the driver, customer satisfaction related to the driving performance may be maximized. Therefore, many methods of learning the driving tendency of the driver and controlling the shift according to the learned driving tendency have been developed.

Generally, a vehicle mode enters a sport mode from a normal mode when a short term driving tendency index is greater than a predetermined value. After that, the sport mode is released when the short term driving tendency index is less than or equal to the predetermined value, and thus, the vehicle mode returns to the normal mode. Entrance to the sport mode may be generated by a one-time rapid acceleration (short term driving tendency) or a continuous driving tendency (long term driving tendency). The sport mode should be immediately returned to the normal mode when the vehicle mode enters the sport mode according to the short term driving tendency. Further, the sport mode should be maintained when the vehicle mode enters sport mode according to the long term driving tendency.

However, the sport mode depending on the short term driving tendency may cause an acceleration complaint of the driver since the duration of the sport mode is determined to be substantially short. Moreover, the sport mode depending on the long term driving tendency may cause disharmony since the duration of the sport mode is determined to be substantially long.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for controlling a driving mode of a vehicle having advantages of controlling the driving mode based on a middle term driving tendency index calculated based on a short term driving tendency index. The present invention also provides an apparatus and a method for controlling a driving mode of a vehicle having advantages of maintaining a sport mode for a delay time determined by a middle term driving tendency.

An exemplary embodiment of the present invention provides an apparatus for controlling a driving mode of a vehicle that may include a driving information detector configured to detect driving information to determine driving tendency of a driver and a controller configured to calculate a short term driving tendency index of the driver based on the driving information and operate at least one of an engine and a transmission based on the short term driving tendency index. The controller may also be configured to calculate a middle term driving tendency index using the short term driving tendency index, determine a delay time using the middle term driving tendency index, enter a sport mode based on the short term driving tendency index, and release the sport mode after delaying the delay time when the short term driving tendency index satisfies releasing conditions of the sport mode.

The controller may include a middle term driving tendency calculator configured to calculate the middle term driving tendency index by cumulative distribution or cumulative averaging of the short term driving tendency index for a middle term predetermined time and a mode changer configured to enter a sport mode when the short term driving tendency index satisfies entrance conditions for entering the sport mode, and release the sport mode after delaying the delay time when the short term driving tendency index satisfies releasing conditions of the sport mode.

The controller may include a short term driving tendency calculator configured to calculate the short term driving tendency index by applying a fuzzy control theory and setting a membership function to the driving information. The controller may further include a long term driving tendency calculator configured to calculate a long term driving tendency index by cumulative distribution or cumulative averaging of the short term driving tendency index for a long term predetermined time. The driving information may include at least one of a speed of the vehicle, an acceleration of the vehicle, a distance between vehicles, a position of an accelerator pedal, a position of a brake pedal, a shift gear of the vehicle, a steering angle of the vehicle, a vehicle position, and road information.

Another exemplary embodiment of the present invention provides a method for controlling a driving mode of a vehicle, that may include: detecting driving information of the vehicle; determining a short term driving tendency index based on the driving information; determining a middle term driving tendency index using the short term driving tendency index; setting a delay time using the middle term driving tendency index; entering a sport mode based on the short term driving tendency index; and releasing the sport mode after delaying the delay time when the short term driving tendency index satisfies releasing conditions.

Yet another exemplary embodiment of the present invention provides a method for controlling a driving mode of a vehicle, that may include: detecting driving information of the vehicle for determining driving tendency of a driver; determining a short term driving tendency index based on the driving information; determining a middle term driving tendency index and a long term driving tendency index based on the short term driving tendency index; determining whether the short term driving tendency index satisfies predetermined entrance conditions for entering a sport mode; entering the sport mode when the short term driving tendency index satisfies the entrance conditions; determining whether the short term driving tendency index satisfies releasing conditions; setting a delay time based on the middle term driving tendency index when the short term driving tendency index satisfies the releasing conditions; and releasing the sport mode after delaying the delay time from a condition satisfaction time.

An exemplary embodiment of the present invention may prevent acceleration complaints and disharmony due to an engine brake by controlling the sport mode according to the middle term driving tendency index. In addition, the sport mode may be maintained for a predetermined delay time according to the middle term driving tendency, so the driving mode of the vehicle may be discriminately controlled according to the driving tendency of the driver. Further, effects that may be obtained or expected from exemplary embodiments of the present invention are directly or suggestively described in the following detailed description. That is, various effects from exemplary embodiments of the present invention will be described in the following detailed description.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
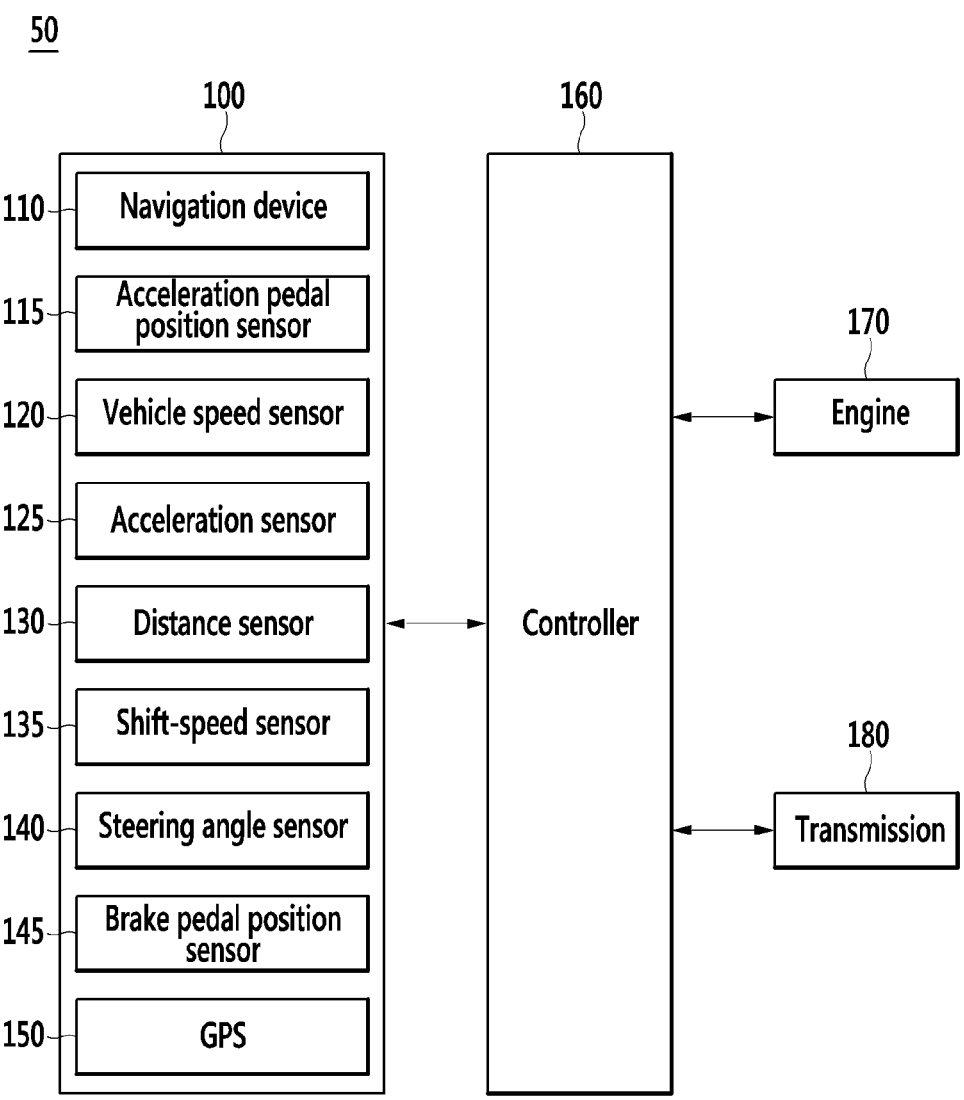
FIG. 1 is an exemplary block diagram schematically illustrating an apparatus for controlling a driving mode of a vehicle according to an exemplary embodiment of the present invention.

Hereinafter, an operation principle of an apparatus and a method for controlling a driving mode of a vehicle according to an exemplary embodiment of the present invention will be described in detail with reference to the accompanying drawings. However, the attached drawings and a detailed description to be given later relate to an exemplary embodiment of several exemplary embodiments for effectively describing a characteristic of the present invention. Therefore, the present invention is not limited to only the following drawings and description.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, detailed descriptions of well-known functions and structures incorporated herein may be omitted to avoid obscuring the subject matter of the present invention. The terms used herein are defined according to the functions of the present invention, and may vary depending on a user's or an operator's intension and usage. Therefore, the terms used herein should be understood based on the descriptions made herein.

Further, in order to effectively describe technical characteristics of the present invention, the following exemplary embodiment may appropriately change, integrate, or separate terms to be clearly understood by a person of ordinary skill in the art, and the present invention is not limited thereto.

Hereinafter, an exemplary embodiment of the present invention will be described in detail with reference to the accompanying drawings.

FIG. 1 is an exemplary block diagram schematically illustrating an apparatus for controlling a driving mode of a vehicle according to an exemplary embodiment of the present invention. As shown in FIG. 1, an apparatus for controlling a driving mode of a vehicle 50 according to an exemplary embodiment of the present invention may include a driving information detector 100, a controller 160, an engine 170, and a transmission 180. The controller 160 may be configured to operate to the driving information detector 100, the engine 170, and the transmission 180.

The driving information detector 100 may be configured to detect driving information for determining a driving tendency of a driver. The driving information detected by the driving information detector 100 may be transmitted to the controller 160. Herein, the driving information may include at least one of a speed of the vehicle, an acceleration of the vehicle, a distance between multiple vehicles, a position of an accelerator pedal (e.g., an engagement degree), a position of a brake pedal (e.g., an engagement degree), a shift gear of the vehicle, a steering angle of the vehicle, a vehicle position, and road information. For these purposes, the driving information detector 100 may include at least one of a navigation device 110, an accelerator pedal position sensor 115, a vehicle speed sensor 120, an acceleration sensor 125, a distance sensor 130, a shift-speed sensor 135, a steering angle sensor 140, a brake pedal position sensor 145, and a global positioning system (GPS) 150.

The navigation device 110 is a device configured to notify the driver of a route to a destination. The navigation device 110 may include an input/output portion configured to receive or output information for guidance of the route, a current position detecting portion configured to detect information regarding a current position of the vehicle, a memory in which map data for calculating the route and a data for guiding the route may be stored, and a controller configured to search the route and perform guidance of the route.

However, it is sufficient in an exemplary embodiment of the present invention for the navigation device 110 to provide information regarding a road shape such as a gradient of a road or a curvature radius of the road to the controller 160. Therefore, it is to be understood that the navigation device 110 may include any device which may provide the information regarding the road shape to the controller 160 in this specification and the claims.

The accelerator pedal position sensor 115 may be configured to detect an engagement degree of an accelerator pedal (e.g., amount of pressure exerted onto the pedal). In other words, the accelerator pedal position sensor 115 may be configured to the driving information related to the driver's acceleration intent. Additionally, the vehicle speed sensor 120 may be configured to detect a vehicle speed, and may be mounted at a wheel of the vehicle. The vehicle speed may also be calculated based on a GPS signal received by the GPS 150.

Further, the acceleration sensor 125 may be configured to detect acceleration of the vehicle and may be mounted in addition to the vehicle speed sensor 120 and may be configured to detect the vehicle acceleration, or the vehicle acceleration may be calculated by differentiating the vehicle speed detected by the vehicle speed sensor 120. The distance sensor 130 may be configured detect a distance between the vehicle of the driver (e.g., the present vehicle) and a preceding vehicle. Various sensors such as an ultrasonic wave sensor and an infrared sensor may be used as the distance sensor 130.

The shift-speed sensor 135 may be configured to detect a shift-speed that is currently engaged and detect a steering angle of the vehicle. In other words, the steering angle sensor 140 may be configured to detect a direction in which the vehicle is running, that is, is traveling. The brake pedal position sensor 145 may be configured to detect whether a brake pedal is engaged. The GPS 145 may be configured to receive a radio wave transmitted from a GPS satellite to determine a position of the vehicle based on a signal therefrom. The GPS 145 may be configured to transfer the signal received from the GPS satellite to the navigation device 110 and the controller 160.

The controller 160 may be configured to determine the driving tendency of the driver based on the driving information detected by the driving information detector 100. In particular, the controller 160 may be configured to calculate a short term driving tendency index for a short predetermined time based on driving information detected by the driving information detector 100, and determine a short term driving tendency of the driver. The controller 160 may further be configured to calculate a middle term driving tendency index and a long term driving tendency index based on the short term driving tendency index. The controller 160 may then be configured to enter a sport mode based on the short term driving tendency index. In addition, the controller 160 may be configured to release the sport mode after delaying for the delay time when the short term driving tendency index satisfies releasing conditions of the sport mode.

Meanwhile, the controller 160 may be configured to determine a condition of a road on which the vehicle is currently traveling based on the data detected by the driving information detector 100. The road condition may include a specific road state such as an icy road, a slippery road, a rough road, and an unpaved road, a specific road shape such as a curve road and an inclined road, and a congestion degree. When the road condition shows the specific road state, the specific road shape, or the congested road, the vehicle may not be running according to the driving tendency of the driver but according to the road condition. Therefore, the driving tendency of the driver may be more accurately determined by not calculating the short term driving tendency of the driver under the specific road condition.

Moreover, the short term driving tendency of the driver may be calculated under the specific road condition. In particular, a filter may be applied to the short term driving tendency of the driver calculated under the specific road condition. The controller 160 may be configured to operate the engine 170 or the transmission 180 according to the driving tendency of the driver. In other words, the controller 160 may be configured to change a shift pattern, engage feeling to the target shift-speed, an engine torque map, and/or an engine torque filter according to the short term driving tendency. For these purposes, the controller 160 may be realized by one or more processors activated by a predetermined program, and the predetermined program may be programmed to perform each step of a method for controlling a driving mode of a vehicle according to an exemplary embodiment of the present invention.

Figure 2:
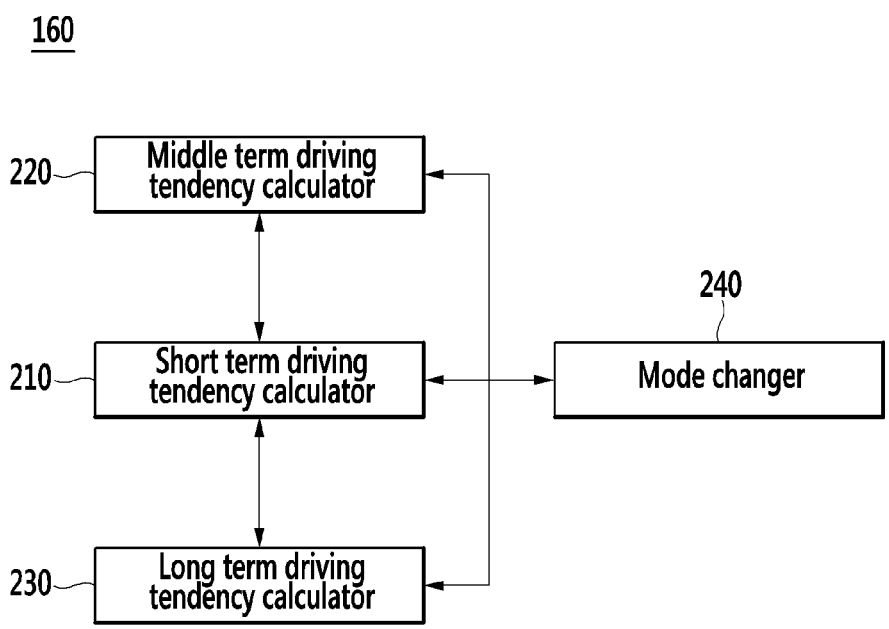
FIG. 2 is an exemplary block diagram schematically illustrating a configuration of a controller according to an exemplary embodiment of the present invention.

Furthermore, the operation of the engine 170 may be executed to an optimal driving point according to the control of the controller 160. A shift ratio of the transmission 180 may be adjusted according to the control of the controller 160. The transmission 180 may be configured to deliver the engine torque to the driving wheel to drive the vehicle and may be applied as an automatic transmission or a continuously variable transmission. The controller 160 will be described in detail with reference to FIG. 2. FIG. 2 is an exemplary block diagram schematically illustrating a configuration of a controller 160 according to an exemplary embodiment of the present invention.

As shown in FIG. 2, the controller 160 may include a short term driving tendency calculator 210, a middle term driving tendency calculator 220, a long term driving tendency calculator 230, and a mode changer 240. The short term driving tendency calculator 210 may be configured to determine the short term driving tendency of the driver for a substantially short time period based on driving information detected by the driving information detector 100. In other words, the short term driving tendency index calculator 210 may be configured to determine the driving tendency of the driver, for example, during current driving or for a short term predetermined time period in the current driving. The short term driving tendency of the driver determined by the short term driving tendency index calculator may be calculated as a short term driving tendency index. Herein, the short term predetermined time may indicate several seconds, and may be determined by a predetermined algorithm. A long term predetermined time may be greater than the short term predetermined time.

The short term driving tendency calculator 210 may be configured to determine the short term driving tendency of the driver based on the short term driving tendency index. In other words, the short term driving tendency calculator 210 may be configured to set a membership function to the driving information by applying a fuzzy control theory to the driving information, and may be configured to calculate a fuzzy result which may be the same as the short term driving tendency index. The short term driving tendency calculator 210 may be configured to determine that the driver has a sport driving tendency as the short term driving tendency index increases.

Moreover, the short term driving tendency calculator 210 may be configured to determine a mild driving tendency as the short term driving tendency index decreases. In other words, the controller may be configured to determine that the driver has a gentle acceleration habit and a defensive driving pattern has the mild driving tendency, and the driver has a rapid acceleration habit and an aggressive driving pattern has the sport driving tendency. For these purposes, the short term driving tendency calculator 210 may be provided with one or more microprocessors, and the one or more microprocessors may be executed by a predetermined program for performing a method of determining the short term driving tendency of the driver.

The middle term driving tendency calculator 220 may be configured to calculate the middle term driving tendency index based on the short term driving tendency index. In other words, the middle term driving tendency calculator 220 may be configured to calculate the middle term driving tendency index by cumulative distributing or cumulative averaging of the short term driving tendency index calculated by the short tem driving tendency calculator 210 for a middle term predetermined time (e.g., greater than the short term predetermined time but less than the long term predetermined time). Herein, the middle term predetermined time may be several minutes, and may be determined by a predetermined algorithm. The middle term driving tendency calculator 220 may be configured to determine the middle term driving tendency of the driver based on the middle term driving tendency index. For these purposes, the middle term driving tendency calculator 220 may be provided with one or more microprocessors, and the one or more microprocessors may be executed by a predetermined program for performing a method of determining the middle term driving tendency of the driver.

The long term driving tendency calculator 230 may be configured to the long term driving tendency index based on the short term driving tendency index. Additionally, the long term driving tendency calculator 230 may be configured to determine the long term driving tendency of the driver based on the long term driving tendency index. In other words, the long term driving tendency calculator 230 may be configured to calculate the long term driving tendency index by cumulative distributing or cumulative averaging of the short term driving tendency index calculated by the short term driving tendency calculator 210 for a long term predetermined time. Herein, the long term predetermined time may indicate several hours, and may be determined by a predetermined algorithm. For these purposes, the long term driving tendency calculator 230 may be provided with one or more microprocessors, and the one or more microprocessors may be executed by a predetermined program for performing a method of determining the long term driving tendency of the driver.

The mode changer 240 may be configured to determine the driving mode of the vehicle based on the short term driving tendency index. The mode changer 240 may be configured to enter the sport mode when the short term driving tendency index satisfies entrance conditions for entering the sport mode. In addition, the mode changer 240 may be configured to release the sport mode after delaying the delay time when the short term driving tendency index satisfies releasing conditions of the sport mode. Herein, the delay time may be determined using the middle term driving tendency index.

The entrance condition may be a predetermined condition to enter the sport mode, and the releasing condition may be a predetermined condition to release the sport mode and enter a normal mode. The entrance condition and the releasing condition may be determined by a predetermined algorithm. For these purposes, the mode changer 240 may be provided with one or more microprocessors, and the one or more microprocessors may be executed by a predetermined program for performing a method of changing the driving mode of the vehicle.

Figure 3:
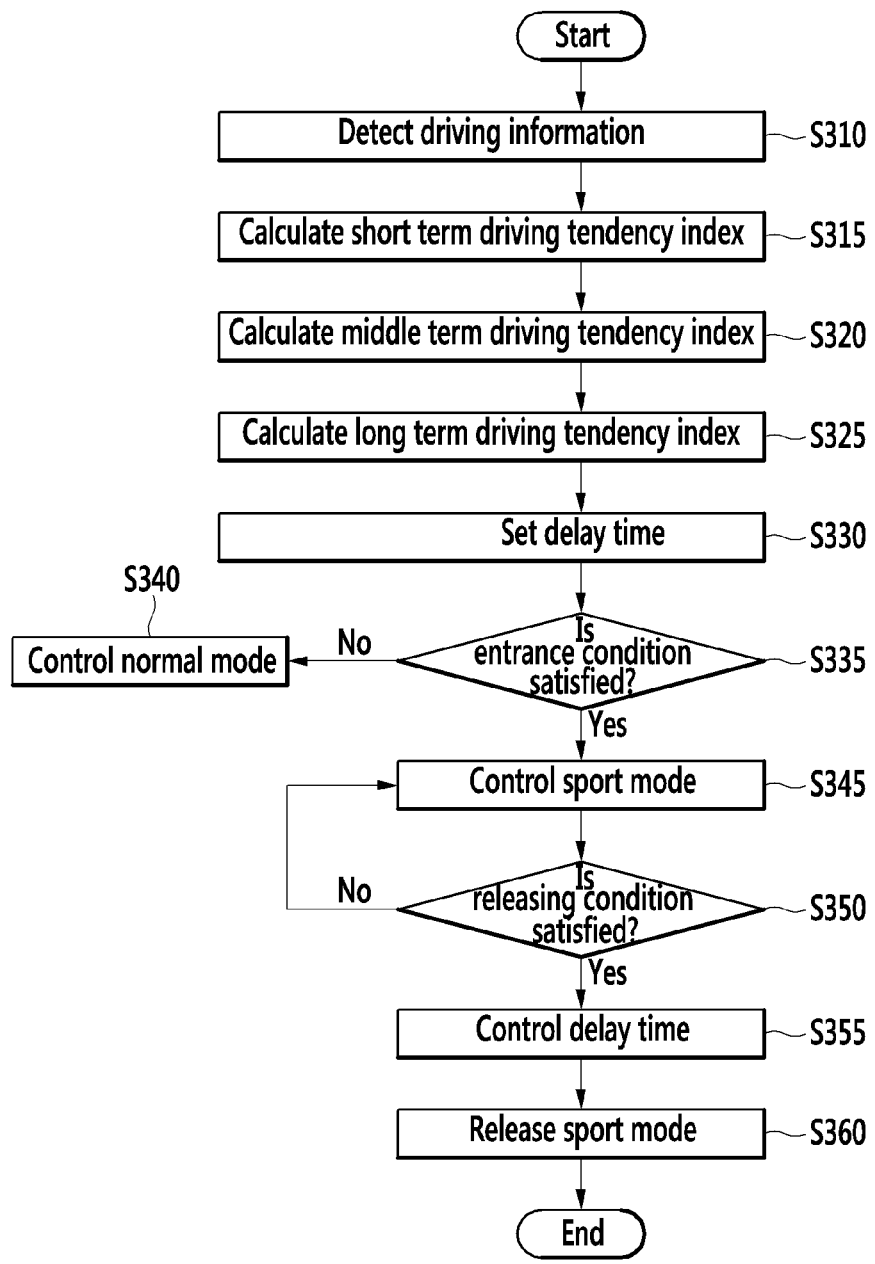
FIG. 3 is an exemplary flowchart of a method for controlling a driving mode of a vehicle according to an exemplary embodiment of the present invention.

FIG. 3 is an exemplary flowchart of a method for controlling a driving mode of a vehicle according to an exemplary embodiment of the present invention. The components of the controller 160 according to an exemplary embodiment of the present invention that is described with reference to FIG. 2 may be integrated or subdivided, so it should be understood that components capable of those functions described above may be the components of the controller 160 according to an exemplary embodiment of the present invention, irrespective of the names. Hereinafter, when describing a method for controlling a driving mode of a vehicle according to an exemplary embodiment of the present invention, in each step, the controller 160 instead of the components of the controller 160 will be described as a subject.

The driving information detector 100 may be configured to detect driving information of the vehicle for determining the driving tendency of the driver at step S310. Herein, the driving information may include at least one of a speed of the vehicle, an acceleration of the vehicle, a distance between vehicles, a position of an accelerator pedal, a position of a brake pedal, a shift gear of the vehicle, a steering angle of the vehicle, a vehicle position, and road information.

The controller 160 may be configured to calculate the short term driving tendency index based on the driving information at step S315. In other words, the controller 160 may be configured to set a membership function to the driving information by applying a fuzzy control theory to the driving information. The controller 160 may additionally be configured to calculate a fuzzy result which may be the same as the short term driving tendency index using the membership function. Accordingly, the controller 160 may be configured to update the short term driving tendency index within several seconds. In addition, the controller 160 may be configured to calculate an average of the short term driving tendency index.

The controller 160 may further be configured to calculate the middle term driving tendency index by cumulative distributing or cumulative averaging of the short term driving tendency index calculated at the step S315 for a middle term predetermined time at step S320. Particularly, the controller 160 may be configured to calculate the middle term driving tendency index using the average of the short term driving tendency index. The controller 160 may then be configured to calculate the long term driving tendency index by cumulative distributing or cumulative averaging of the short term driving tendency index calculated at the step S315 for a long term predetermined time at step S325. In particular, the controller 160 may be configured to calculate the long term driving tendency index using the average of the short term driving tendency index.

Figure 4:
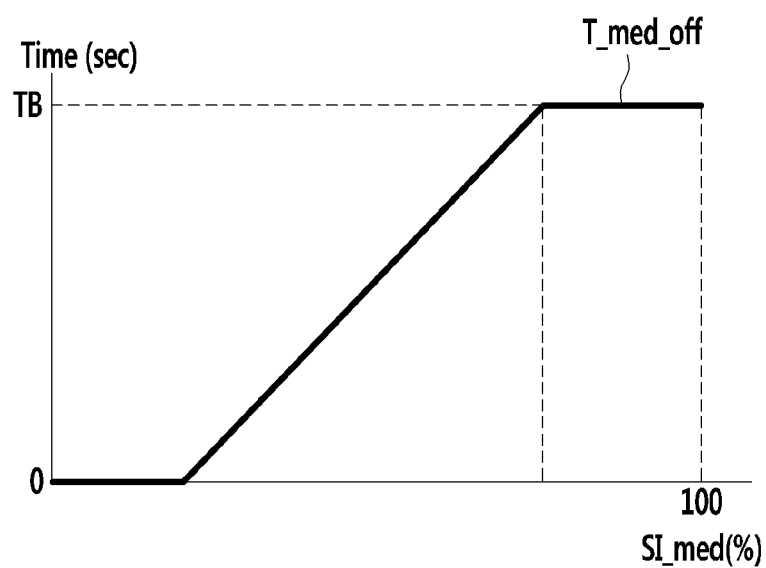
FIG. 4 is an exemplary graph illustrating a relation between a middle term driving tendency index and a time according to an exemplary embodiment of the present invention.

Furthermore, the controller 160 may be configured to set a delay time for maintaining the sport mode based on the middle term driving tendency index at step S330. For example, the controller 160 may be configured to set the delay time T_med_off based on the middle term driving tendency index SI_med as shown in FIG. 4. Herein, the delay time T_med_off may not exceed a predetermined maximum time TB. The predetermined maximum time TB may be predetermined in advance, and for example, it may be about twenty seconds. When the delay time exceeds the predetermined maximum time, the driving tendency of the driver may not be determined.

Figure 5:
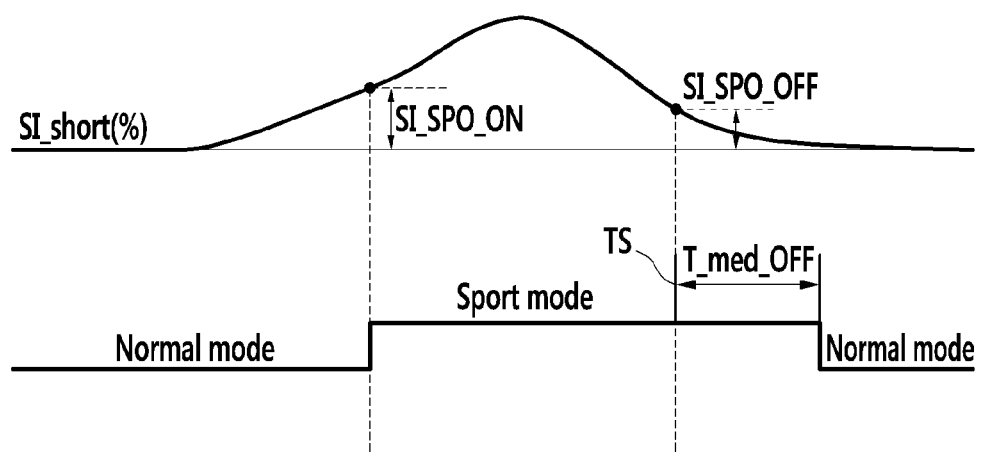
FIG. 5 is an exemplary graph illustrating a relation between a short term driving tendency index and a driving mode according to an exemplary embodiment of the present invention.

The controller 160 may be configured to determine whether the short term driving tendency index satisfies predetermined entrance conditions for entering a sport mode at step S335. As shown in FIG. 5, the controller 160 may be configured to determine whether the short term driving tendency index SI_short is greater than or equal to the entrance condition SI_SPO_ON. When the short term driving tendency index does not satisfy the entrance condition at the step S335, the controller 160 may be configured to enter a normal mode at step S340. In other words, as shown in FIG. 5, the controller 160 may be configured to enter the normal mode when the short term driving tendency index SI_short is less than the entrance condition SI_SPO_ON. And then, the controller 160 may be configured to operate the engine 170 or the transmission 180 according to the normal mode.

When the short term driving tendency index satisfies the entrance condition at the step S335, the controller 160 may be configured to enter the sport mode, and operate the engine 170 or the transmission 180 according to the sport mode at step S345. In other words, as shown in FIG. 5, the controller 160 may be configured to enter the sport mode when the short term driving tendency index SI_short is greater than or equal to the entrance condition SI_SPO_ON. And then, the controller 160 may be configured to operate the engine 170 or the transmission 180 based on the short term driving tendency index, the middle term driving tendency index, and the long term driving tendency index calculated at the step S315 to S325.

The controller 160 may further be configured to determine whether the short term driving tendency index satisfies releasing conditions at step S350. When the short term driving tendency index does not satisfy the releasing conditions at the step S350, the process is returned to the step S345, and the controller 160 may be configured to execute the driving mode as the sport mode. Further, when the short term driving tendency index satisfies the releasing conditions at the step S350, the controller 160 may be configured to delay the time by as much as a delay time at step S355. As shown in FIG. 5, the controller 160 may be configured to detect a condition satisfaction time TS when the short term driving tendency index SI_short is less than or equal to the releasing condition SI_SPO_OFF. After that, the controller 160 may be configured to delay the delay time T_med_off from the condition satisfaction time TS. The controller 160 may then be configured to release the sport mode after delaying the delay time and enter the normal mode at step S360.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

50: control apparatus for driving mode of vehicle
100: driving information detector
110: navigation device
115: acceleration pedal position sensor
120: vehicle speed sensor
125: acceleration sensor
130: distance sensor
135: shift-speed sensor
140: steering angle sensor
145: brake pedal position sensor
150: GPS
160: controller
170: engine
180: transmission

What is claimed is:

1. An apparatus for controlling a driving mode of a vehicle, comprising:
    a driving information detector configured to detect driving information to determine driving tendency; and
    a controller configured to calculate a short term driving tendency index based on the driving information and operate at least one of an engine and a transmission based on the short term driving tendency index,
    wherein the controller is configured to calculate a middle term driving tendency index using the short term driving tendency index, determine a delay time using the middle term driving tendency index, enter a sport mode based on the short term driving tendency index, and release the sport mode after delaying the delay time when the short term driving tendency index satisfies releasing conditions of the sport mode.

2. The apparatus of claim 1, wherein the controller is further configured to:
    calculate the middle term driving tendency index by cumulative distributing or cumulative averaging of the short term driving tendency index for a middle term predetermined time; and
    enter a sport mode when the short term driving tendency index satisfies entrance conditions for entering the sport mode, and release the sport mode after delaying the delay time when the short term driving tendency index satisfies releasing conditions of the sport mode.

3. The apparatus of claim 1, wherein the controller is further configured to:
calculate the short term driving tendency index by applying a fuzzy control theory and setting a membership function to the driving information.

4. The apparatus of claim 1, wherein the controller is further configured to:
calculate a long term driving tendency index by cumulative distributing or cumulative averaging of the short term driving tendency index for a long term predetermined time.

5. The apparatus of claim 1, wherein the driving information includes at least one selected from the group consisting of: a speed of the vehicle, an acceleration of the vehicle, a distance between vehicles, a position of an accelerator pedal, a position of a brake pedal, a shift gear of the vehicle, a steering angle of the vehicle, a vehicle position, and road information.

6. A method for controlling a driving mode of a vehicle, comprising:
detecting, by a controller, driving information of the vehicle;
determining, by the controller, a short term driving tendency index based on the driving information;
determining, by the controller, a middle term driving tendency index using the short term driving tendency index;
setting, by the controller, a delay time using the middle term driving tendency index;
entering, by the controller, a sport mode based on the short term driving tendency index; and
releasing, by the controller, the sport mode after delaying the delay time when the short term driving tendency index satisfies releasing conditions.

7. The method of claim 6, wherein the releasing the sport mode includes:
determining, by the controller, whether the short term driving tendency index satisfies releasing conditions;
detecting, by the controller, a condition satisfaction time when the short term driving tendency index satisfies releasing conditions; and
releasing, by the controller, the sport mode after delaying the delay time from the condition satisfaction time.

8. The method of claim 6, wherein the entering the sport mode includes:
determining, by the controller, whether the short term driving tendency index satisfies entrance conditions for entering the sport mode; and
entering, by the controller, the sport mode when the short term driving tendency index satisfies the entrance conditions.

9. The method of claim 6, wherein the determining the middle term driving tendency index includes:
determining, by the controller, the middle term driving tendency index by cumulative distributing or cumulative averaging of the short term driving tendency index for a middle term predetermined time.

10. The method of claim 6, further comprising:
determining, by the controller, a long term driving tendency index by cumulative distributing or cumulative averaging of the short term driving tendency index for a long term predetermined time after calculating the short term driving tendency index.

11. A method for controlling a driving mode of a vehicle, comprising:
detecting, by a controller, driving information of the vehicle for determining driving tendency;
determining, by the controller, a short term driving tendency index based on the driving information;
determining, by the controller, a middle term driving tendency index and a long term driving tendency index based on the short term driving tendency index;
determining, by the controller, whether the short term driving tendency index satisfies predetermined entrance conditions for entering a sport mode;
entering, by the controller, the sport mode when the short term driving tendency index satisfies the entrance conditions;
determining, by the controller, whether the short term driving tendency index satisfies releasing conditions;
setting, by the controller, a delay time based on the middle term driving tendency index when the short term driving tendency index satisfies the releasing conditions; and
releasing, by the controller, the sport mode after delaying the delay time from a condition satisfaction time.

12. The method of claim 11, wherein the determining of the middle term driving tendency index and the long term driving tendency index includes:
determining, by the controller, the middle term driving tendency index by cumulative distributing or cumulative averaging of the short term driving tendency index for a middle term predetermined time; and
determining, by the controller, the long term driving tendency index by cumulative distributing or cumulative averaging of the short term driving tendency index for a long term predetermined time.

13. The method of claim 11, wherein the calculating of the short term driving tendency index includes:
setting, by the controller, a membership function to the driving information by applying a fuzzy control theory to the driving information; and
calculating, by the controller, a fuzzy result value which is the same as the short term driving tendency index from the membership function.

14. The method of claim 11, wherein the driving information includes at least one selected from the group consisting of: a speed of the vehicle, an acceleration of the vehicle, a distance between vehicles, a position of an accelerator pedal, a position of a brake pedal, a shift gear of the vehicle, a steering angle of the vehicle, a vehicle position, and road information.

* * * * *